United States Patent [19]

Alesbury

[11] Patent Number: 4,728,574

[45] Date of Patent: Mar. 1, 1988

[54] ELECTRIC CABLE WITH INSULATION OF ETHYLENE VINYL ALCOHOL COPOLYMER AND AMMONIUM POLYPHOSPHATE

[75] Inventor: Colin K. Alesbury, Southampton, England

[73] Assignee: Societa' Cavi Pirelli S.p.A., Milan, Italy

[21] Appl. No.: 907,591

[22] Filed: Sep. 15, 1986

[30] Foreign Application Priority Data

Oct. 1, 1985 [GB] United Kingdom ............... 8524113

[51] Int. Cl.⁴ .............................................. B32B 15/00
[52] U.S. Cl. .............................. 428/379; 174/121 A; 427/120; 427/126.1; 428/375
[58] Field of Search ............... 428/379, 375; 427/120, 427/126.1; 523/179, 451; 524/416

[56] References Cited

U.S. PATENT DOCUMENTS

4,013,599  3/1977  Strauss et al. ............... 428/460 X
4,514,328  4/1985  Staendke ........................ 252/609

FOREIGN PATENT DOCUMENTS

755551   8/1956  United Kingdom .
2013215A 8/1979  United Kingdom .
2142638A 1/1985  United Kingdom .

OTHER PUBLICATIONS

Camino et al. Polymer Degradation & Stability, 7 (1984) pp. 25–31; "Study of The Mechanism of Intumescence in Fire Retardant Polymers".

*Primary Examiner*—Theodore E. Pertilla
*Attorney, Agent, or Firm*—Brooks, Haidt, Haffner & Delahunty

[57] ABSTRACT

A fire retardant polymeric compound comprises a polymer having hydroxyl groups and an inorganic phophate so as to produce a char by the process of intumescence when subjected to combustion. The polymer may be an ethylene vinyl alcohol copolymer and the inorganic phosphate may be ammonium polyphosphate.

4 Claims, No Drawings

ELECTRIC CABLE WITH INSULATION OF ETHYLENE VINYL ALCOHOL COPOLYMER AND AMMONIUM POLYPHOSPHATE

This invention relates to fire retardant polymeric compounds, and particularly, but not exclusively, to such a compound for use in forming a layer, such as a sheath or a filler, of an electric cable.

It is known to provide polymeric compounds used for forming a sheath or filler layer of an electric cable with a hydrated inorganic filler, such as hydrated alumina, which forms a protective char or ash when the cable is subjected to combustion. However the char formed tends to shuck off during combustion exposing the underlying polymeric material to flame. Furthermore these known compounds are not easily processed because of their high filler content—typically 150 parts by weight per hundred parts by weight of polymer. For example motor loadings on screw extruders used to extrude the compounds are high, necessitating the use of relatively slow extrusion rates. The maximum oxygen index of these compounds is about 40% as measured according to BS 2782: Part 1: methods 141A to 141D: 1978 and the maximum temperature index (that is the temperature at which the oxygen index of the compound is 20.8) is about 270° C.

A more stable char is obtainable with a fire retardant polymeric compound, as disclosed in No. GB-A-2 142 638 which comprises a polymer and an intumescent mixture of an inorganic phosphate and a polyhydroxy compound. Examples given in No. GB-A-2 142 638 of an inorganic phosphate and a polyhydroxy compound are ammonium polyphosphate and pentaerythritol respectively. However, we have found that the electrical and fire retardane properties of such a polymeric compound are reduced on exposure to damp or wet conditions due to the solubility of pentaerythritol in water. Such a polymeric compound is therefore not satisfactory for use in electric cables, particularly for the outer sheaths thereof.

An object of the invention is to provide a fire retardant polymeric compound which will produce a char by the process of intumescence but which has better impermeability than such a compound which contains pentaerythritol.

The invention includes a fire retardant polymeric compound comprising a polymer having hydroxyl groups and an inorganic phosphate.

The invention enables a compound to be provided which has superior flame retardant characteristics than those discussed above, for example an oxygen index of 74% and a temperature index greater than 400° C. are achievable with some embodiments of the invention. Also since a compound embodying the invention need not contain a filler such as hydrated alumina, or can contain such a filler at reduced levels, it can be more easily extruded than the above-discussed fire retardant polymeric compounds used in cable manufacture heretofore.

The invention also includes an electric cable comprising at least one polymeric layer formed of a fire retardant compound as defined in the last but one preceding paragraph. For example, the sheath of the cable or a filler layer thereof in which insulated conductors are embedded may be formed by the extrusion of such a compound.

Preferably, the inorganic phosphate comprises ammonium polyphosphate.

Preferably the polymer comprises an ethylene vinyl alcohol copolymer.

When an ethylene vinyl alcohol copolymer (EVOH) and ammonium polyphosphate (APP) are present in the compound there should preferably be at least 50 parts by weight of ammonium polyphosphate per 100 parts by weight of ethylene vinyl alcohol copolymer, and extremely good fire retardant characteristics are obtainable when there are substantially 150 parts by weight of ammonium polyphosphate per hundred parts by weight of ethylene vinyl alcohol copolymer.

The ethylene vinyl alcohol may be a random copolymer of ethylene and vinyl alcohol or a block copolymer, and preferably the copolymer comprises at least 60% vinyl alcohol. As will be appreciated it is the vinyl alcohol which provides the hydroxyl groups for the intumescence process, and thus the higher the vinyl alcohol the more effective the fire retardant characteristics of the compound.

The compound may include one or more other polymers, such as EVA, EPDM, and olefin polymers and copolymers, and/or at least one filler, such as clay, hydrated alumina, whiting or aluminium sulphate.

Three specific examples of fire retardant polymeric compounds embodying the invention and test results therefor are given below:

| Compound | A | B | C |
|---|---|---|---|
| parts by weight EVOH | 100 | 112.5 | 150 |
| parts by weight APP | 150 | 75 | 225 |
| parts by weight EVA | — | 66⅔ | 66⅔ |
| parts by weight EPDM | — | 33⅓ | 33⅓ |
| Oxygen Index % | 74.0 | 34.6 | 41.7 |
| Temperature Index °C. | 400 | not tested | 370 |
| Water Permeability gcm/cm² mmHg | ≈5 × 10⁻⁷ | not tested | not tested |

I claim:

1. An insulated electric cable comprising a conductor with a layer of insulation therearound, said layer comprising an ethylene vinyl alcohol copolymer and ammonium polyphosphate.

2. An insulated electric cable as claimed in claim 1 wherein there are at least 50 parts by weight of ammonium polyphosphate per 100 parts by weight of ethylene vinyl alcohol copolymer.

3. An insulated electric cable as claimed in claim 2 wherein there are substantially 150 parts by weight of ammonium polyphosphate per 100 parts by weight of ethylene vinyl alcohol copolymer.

4. An insulated electric cable as claimed in claim 1, 2 or 3 wherein said ethylene vinyl alcohol copolymer comprises at least 60% vinyl alcohol.

* * * * *

UNITED STATES PATENT AND TRADEMARK OFFICE
CERTIFICATE OF CORRECTION

PATENT NO. : 4,728,574

DATED : March 1, 1988

INVENTOR(S) : Alesbury

It is certified that error appears in the above-identified patent and that said Letters Patent is hereby corrected as shown below:

Please change the assignee from Societa' Cavi Pirelli, SpA to -- Pirelli General plc, London, England.--

Signed and Sealed this

Twenty-ninth Day of November, 1988

Attest:

DONALD J. QUIGG

Attesting Officer

Commissioner of Patents and Trademarks